Nov. 12, 1957   E. K. METTLER ET AL   2,812,935
CHECK LINK ARRANGEMENT FOR SCALES
Filed Aug. 12, 1953
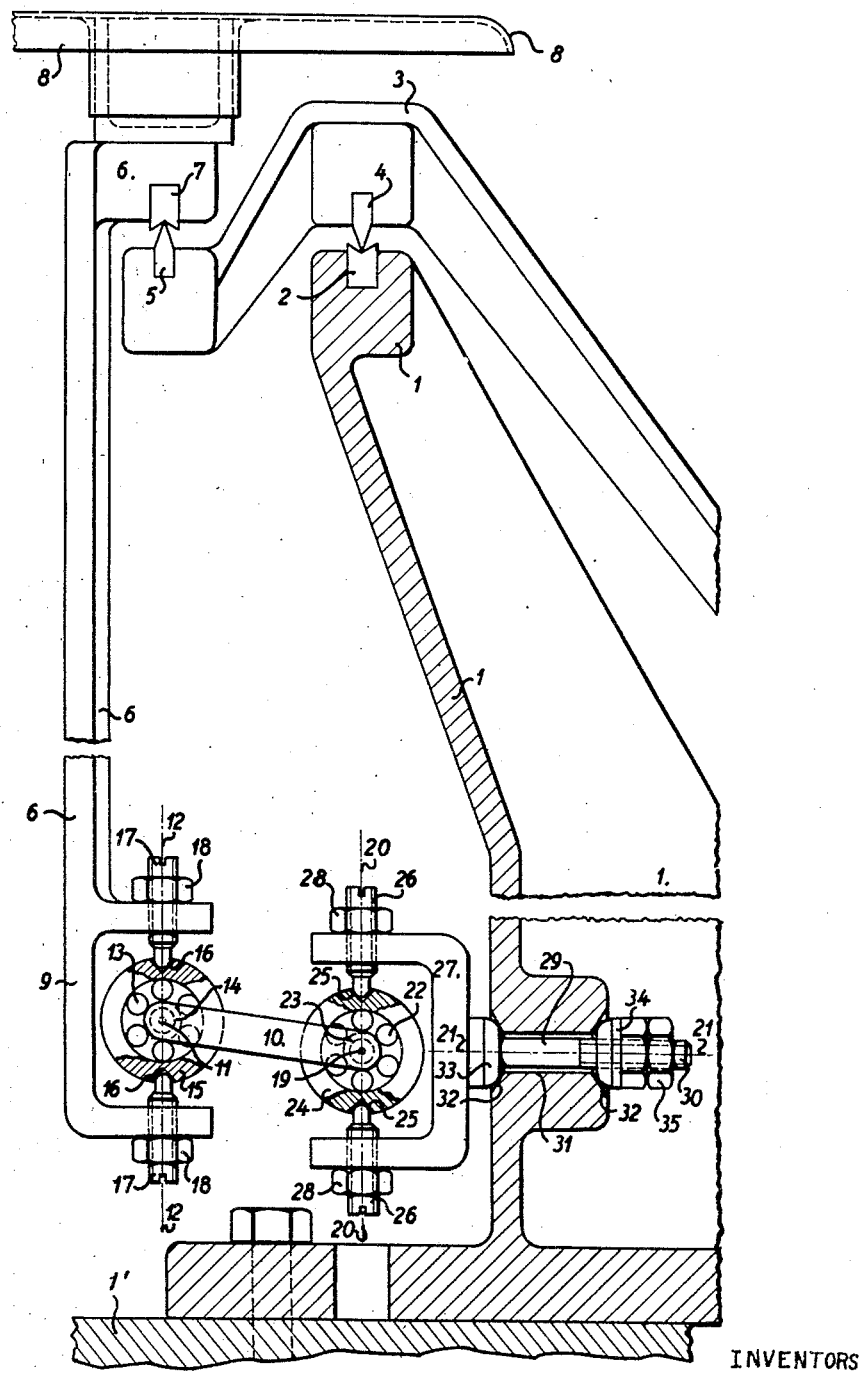
INVENTORS
Erhard Karl Mettler
Johann Meier
by Pierce, Scheffler & Parker
atty's

United States Patent Office 2,812,935
Patented Nov. 12, 1957

2,812,935

CHECK LINK ARRANGEMENT FOR SCALES

Erhard Karl Mettler, Zollikon, and Johann Meier, Stafa, Switzerland; said Meier assignor to said Mettler Application August 12, 1953, Serial No. 373,868

Claims priority, application Switzerland January 21, 1953

6 Claims. (Cl. 265—27)

This invention relates to a balance and more particularly to an inclination balance designed as letter and parcel scale or laboratory balance, comprising a balance supporting frame having a column, a balance beam pivoted on the column, a pan carrier pivoted on the balance beam and supporting a weighing pan above the balance beam, and a steering lever or check link for guiding the pan carrier to have a parallelogrammatic motion.

Objects of the invention are to provide a balance of the type stated in which a Cardan or universal joint connects the steering lever to the pan carrier and a further Cardan or universal joint connects the steering lever to the supporting frame of the balance. In order to avoid possible jamming between the axes of rotation acting on the pan carrier due to the unavoidable free motion in the bearing clearances taking place in the direction of the axes of rotation, one of said Cardan joints has two pivotal axes while the other Cardan joint has three pivotal axes. Objects are to provide, in a balance of the kind outlined, Cardan joints for connecting the steering lever to the pan carrier and to the column of the balance, having an axis of rotation which is parallel to the axis of rotation from which the pan carrier is suspended on the balance beam, and having a second axis of rotation which is vertical. One of said two Cardan joints may be provided with a third axis of rotation which is horizontal and perpendicular to the direction of the axis of rotation by means of which the pan carrier is suspended from the balance beam. Yet another and more specific object is an inclination balance of the character described and comprising a balance beam having a central knife edge and on one of its arms a terminal knife edge, a column having a V-shaped bearing for pivotally supporting said central knife edge of the balance beam, a pan carrier supporting a weighing pan and having a V-shaped bearing by means of which the pan carrier is pivotally supported on said terminal knife edge, a steering lever for guiding said pan carrier to have a parallelogrammatic motion, a Cardan joint connecting said steering lever to said pan carrier, and a further Cardan joint connecting said steering lever to the column of the balance. Each of said Cardan joints has a ball bearing the axis of rotation of which is parallel to said V-shaped bearing on the pan carrier, each of the two Cardan joints has a second axis of rotation, and one of the Cardan joints has a third axis of rotation.

These and other objects and the advantages of the invention will best be understood from the following description of specific embodiments when read in connection with the accompanying drawing it which is shown diagrammatically and by way of example, a construction in accordance with the present invention. Details which are not necessary for an understanding of the invention have, for the sake of greater clarity, been omitted from the drawing.

The supporting frame of the balance, as is customary, has a base 1' on to which the colum 1 (shown in section) is screwed. The column 1 has at its upper end a V-shaped indented bearing 2 in which pivots the centre knife edge 4 of the balance beam 3. The right arm, not completely shown, of the beam 3 is provided with a counterweight (not shown) while the short left arm has a projecting terminal knife edge 5 with its edge parallel, as accurately as possible, with the edge of the centre knife edge 4. The pan carrier 6 with its V-shaped bearing 7 rests on the knife edge 5 of the balance beam with the axis of rotation at right angles to the plane of the drawing and passing through the edge of the knife edge 5 which, as is customary, is in a horizontal position. At the upper end of the pan carrier 6 the weighing pan 8 is supported so as to be situated above the balance beam 3. The lengths of the knife edges 4 and 5 in the direction perpendicular to the plane of the drawing are about equal to the diameter of the weighing pan 8, which is generally circular and the centre of the weighing pan 8 is, at least approximately, situated above the centre of the projecting terminal knife edge 5.

The V-shaped bearings 2 and 7 may be of the same length as the knife edges 4 and 5; mostly, however, each of the two bearings 2 and 7 will consist of two coaxial parts respectively arranged in the direction of the edges of the knife edges 4 and 5.

The lower frame-like part 9 of the pan carrier 6 is now guided with a parallelogrammatic motion by means of a steering lever 10 so that in all cases the inclination of the balance bear 3, which is the measure of the weight of the object placed on the weighing pan 8, is independent of the position at which the object to be weighed is placed on the weighing pan 8.

The steering lever or check link 10 is connected to the lower section 9 of the pan carrier 6 by means of a Cardan or universal joint whose one axis of rotation 11 is parallel with the edge of the knife edge 5 and whose dotted second axis of rotation 12 is arranged in a vertical direction. The axis of rotation 11 of the Cardan joint perpendicular to the plane of the drawing is formed by a single-row of ball bearing with balls 13 moving in guide grooves which are arranged in the inner race 14 as well as in the outer race 15 of the bearing but are not shown in greater detail in the drawing. The inner race 14 is directly connected to the steering lever 10 while the outer race 15 has on opposite sides two conical cavities 16. Inserted into these conical cavities 16 are the chamfered ends of two screw-spindles 17 which are screwed on to the frame-like part 9 of the pan carrier 6 and are secured by lock nuts 18. Thus the outer race 15 of the ball bearing may rotate about the dotted axis 12 with the help of two cone sliding bearings which are formed by the chamfered ends of the screw-spindles 17 and the conical cavities 16. The spindles 17 are tightened sufficiently so that the ball bearing race 15 may just still be rotated easily, but without any free motion, about the dotted axis 12.

On the other end of the steering lever 10 is fixed a further Cardan or universal joint which has three axes, 19, 20, 21 at right angles to each other. The axis of rotation 19, perpendicular to the plane of the drawing, is parallel with the direction of the edge of the knife edge 5 and with the direction of the V-shaped bearing 7 on the pan carrier 6. The axis of rotation 19 is formed by the ball bearing consisting of balls 22, the inner race 23, and the outer race 24. This ball bearing 22, 23, 24 is similar to the ball bearing 13, 14, 15, and the inner race 23 is connected directly to the steering lever 10.

The second vertical axis of rotation 20 of the Cardan joint is provided by two cone sliding bearings which are formed by the conical cavities 25 arranged in the outer race 24 of the ball bearing and by the chamfered ends of screw-spindles 26 projecting into these cavities. The screw-spindles 26 are screwed into a frame-like intermediate part 27 and secured by lock nuts 28.

The third, horizontal, axis of rotation 21 of the Cardan joint is at right angles to the direction of the V-shaped bearing 7 on the pan carrier 6 and is formed by two cone sliding bearings. For this purpose there is fixed on the frame-like intermediate part 27 a shaft 29 provided with a thread 30 at its front end. The column 1 of the balance has a bore 31 through which the shaft 29 projects to be freely movable. The bore 31 has on each of its two ends a conically ground adapting face 32. On the side of the frame-like intermediate part 27, the shaft 29 has a base 33 of larger diameter whose curved front face lies close to the conical adapting face 32. Against the other conical adapting face rests the corresponding curved front surface of part 34 with an hexagonal head. The part 34 is threaded and is screwed on the thread 30 of the shaft 29 and secured by a lock nut 35. The part 34 is attached to the shaft 29 in such a manner that the frame-like part 27 is still able to be rotated easily about the dotted axis 21 but otherwise has no free motion of any kind with respect to the column 1.

It is at once clear that the pan carrier 6 is guided in such a manner that jamming of any kind between the various joints is impossible. The pan carrier 6 therefore rests completely freely with its V-shaped bearing 7 on the knife edge 5 of the balance beam 3. Moreover the linkage providing the parallelogrammatic motion has no parts which can in any way take up an undefined position or be in danger of slipping from the guiding grooves or the like which occasionally happens with the hitherto usual constructions. The pan carrier 6 is guided, by means of the steering lever 10, in an absolutely defined manner which is, moreover, not influenced by whatever position the pan carrier 6 may take up. Therefore, no jamming can occur if, for example, the pan carrier 6 with its V-shaped bearing 7 is shifted a little on the terminal knife edge 5 in the direction perpendicular to the plane of the drawing, i. e. in the longitudinal direction of the edge of the terminal knife edge 5. Such a shifting, which practically always must be tolerated, to the order of a few tenths of a millimeter, therefore produces only a correspondingly small rotation of the ball bearing rings 15 and 25 with respect to the dotted axes of rotation 12 and 20. Since, moreover, the edges of the knife edges 4 and 5 as well as the groove-like V-shaped indentations in the bearings 2 and 7 are never defined by mathematically exact lines or planes, the actual axes of rotation between the balance beam 3 and the column 1 and between weighing pan carrier 6 and balance beam 3 may be subject to certain small variations in their angular position with respect to the plane of the drawing. In other words, these axes of rotation are never exactly at right angles to the plane of the drawing and in consequence also the axes of rotation 12 and 20 of the Cardan joints must follow the above mentioned variations. But in this case too no jamming can occur since changes in the inclinations of the axes of rotation 12 and 20 with respect to the plane of the drawing only lead to correspondingly small rotations of the frame-like part 27 about the axis of rotation 21.

As with all balances where the weighing pan carrier 6 is guided with a parallelogrammatic motion it is essential that the effective length of the steering lever 10 be always the same as the effective length of that arm of the balance beam 3 on which the weighing pan carrier 6 is pivoted. In consequence, the distance between the axes of rotation 11 and 19 of the two Cardan joints must be made exactly the same as the distance between the knife edges 4 and 5. The final adjustment in the arrangement described then solely consists in adjusting the one or other pair of screw-spindles 17 or 26 in such a manner that the distance of the axis of rotation 11 from the edge of knife edge 5 is exactly the same as the distance of the axis of rotation 19 from the edge of knife edge 4.

Thereby the adjustment is practically completed. It must, however, be expressly stated that, in contrast to the hitherto usual constructions providing parallelogrammatic motion it is not necessary for the axes of rotation 11 and 19 to be exactly parallel with the edges of knife edges 4 and 5. An approximately parallel position of the latter with respect to the former suffices.

If the adjustment has been made in the manner described then, when the weighing pan 8 is loaded the pan carrier 6 will, as usual, move downwardly according to the weight of the object. In this movement practically only those parts of the Cardan joints which are jointed through the axes of rotation 11 and 19 change their respective positions but not the parts jointed through the axes of rotation 12, 20 and 21. Therefore when a weighing is carried out, the actual friction in the parallelogrammatic construction is largely due only to the friction in the two ball bearings 13, 14, 15 and 22, 23, 24 if the friction between the V-shaped bearing 2 and centre knife edge 4 and that between the V-shaped bearing 7 and the terminal knife edge 5 of the balance beam 3 is disregarded.

In a way it would also be possible to guide the weighing pan carrier 6 with a parallelogrammatic motion without jamming even if the axes of rotation 11 and 19 are not parallel with the V-shaped bearings 2 and 7. For example, the axes of rotation 11 and 19 could intersect the plane of the drawing at an angle of up to 45°, and furthermore the axes of rotation 12 and 20 could also be arranged at an oblique angle with respect to the edges of the knife edges 4 and 5. The same holds also for the further axis of rotation 21 which must not necessarily be horizontal and perpendicular to the direction of the V-shaped bearings 2 and 7. But then in a normal movement of the weighing pan carrier 6 caused by a weighing all parts of the two Cardan joints would be displaced in their respective positions. In order to avoid too large an over all friction, all five axes of rotation 11, 12, 19, 20 and 21 would be on ball bearings. To obtain a constant effective length of the steering lever 10 it would also be necessary that the axes of rotation 11 and 12 intersect each other and also the axes of rotation 19, 20 and 21 would have to intersect each other in a second point when the effective length of the steering lever 10 would be represented by the distance between these two points of intersection.

If, however, the two axes of rotation 11 and 19 are arranged at least approximately parallel with the direction of the V-shaped bearings 2 and 7 and if the further axes of rotation 12 and 20 are arranged at least approximately vertical, then not only a smaller overall friction in the parallelogrammatic construction but also a simpler and less critical design is achieved. Especially, it is no longer necessary for the axes of rotation 11 and 12 on the one hand and the axes of rotation 19, 20 and 21 on the other hand to intersect, and the adjustment is simpler as explained above. Thus the example represented in the drawing shows a form of construction in accordance with the present invention which at a relatively small expenditure allows great precision in the parallelogrammatic motion of the pan carrier to be achieved.

The invention is not limited to the particular embodiments here shown and described. For a balance having a higher accuracy it may be advisable to provide a housing which encloses the balance beam, the steering lever with the Cardan joints and the pan carrier. Further, the housing can then obviously be provided with an opening, through which the upper part of the pan carrier and the weighing pan extend out of the case. This and other modifications which may occur to those familiar with the art fall within the spirit and scope of the invention as set forth in the following claims.

We claim:

1. A balance, comprising a balance beam having a centre knife edge and on one of its arms a terminal knife edge, a column having a V-shaped bearing for pivotally supporting said centre knife edge of the balance beam, a pan carrier supporting a weighing pan above said balance beam and having a V-shaped bearing by means of which the pan carrier is pivotally supported on said terminal knife edge of the balance beam, a steering lever for guiding said pan carrier to have a parallelogrammatic motion, a first universal joint connecting said steering lever to said pan carrier, a second universal joint connecting said steering lever to the column of the balance, each of said universal joints having a ball bearing the axis of rotation of which is parallel with said V-shaped bearing on the pan carrier, each of said universal joints having a second axis of rotation, and means for rotatably supporting one of said universal joints about a third axis of rotation substantially normal to the pan carrier V-shaped bearing.

2. The invention as recited in claim 1, wherein said means for rotatably supporting one of said universal joints comprises a rotatable connection between said second universal joint and said column.

3. The invention as defined in claim 2 wherein said second axes of rotation of the universal joints and the rotatable connection of said second universal joint include cone bearings.

4. The invention as defined in claim 3 and further including a screw-spindle and lock nut means for adjusting said cone bearings.

5. A balance comprising a supporting frame including a column, a balance beam pivotally mounted on said column, a pan carrier pivoted on said balance beam and supporting a weighing pan above said balance beam, a steering lever for guiding said pan carrier to have a parallelogramatic motion, a first universal joint connecting the steering lever to the pan carrier and a second universal joint connecting the steering lever to the supporting frame, each of said universal joints having two axes of rotation, and means for rotatably supporting one of said universal joints about an axis substantially perpendicular to the pivotal axis of the connection of said pan carrier to said balance beam.

6. A balance as defined in claim 5 wherein the axes of rotation of said universal joints are substantially at right angles to the axis of the universal joint rotatable supporting means.

References Cited in the file of this patent
UNITED STATES PATENTS

| | | |
|---|---|---|
| 404,290 | Koch | May 28, 1889 |
| 844,440 | Braun | Feb. 19, 1907 |
| 1,020,744 | Cochran | Mar. 19, 1912 |
| 1,565,251 | Bousfield | Dec. 15, 1925 |
| 1,695,316 | Burke | Dec. 18, 1928 |
| 2,582,484 | Hart | Jan. 15, 1952 |
| 2,634,966 | Williams | Apr. 14, 1953 |

OTHER REFERENCES

Page 37 of "Industrial Weighing," Douglas M. Considine, published 1948 by Reinhold Publishing Corporation, 330 W. 42nd Street, New York, N. Y.